United States Patent
Tangeland et al.

(10) Patent No.: US 9,197,856 B1
(45) Date of Patent: Nov. 24, 2015

(54) VIDEO CONFERENCING FRAMING PREVIEW

(71) Applicant: Cisco Technology Inc., San Jose, CA (US)

(72) Inventors: Kristian Tangeland, Oslo (NO); Vigleik Norheim, Oslo (NO)

(73) Assignee: Cisco Technology Inc., San Jose, CA (US)

(*) Notice: Subject to any disclaimer, the term of this patent is extended or adjusted under 35 U.S.C. 154(b) by 0 days.

(21) Appl. No.: 14/315,941

(22) Filed: Jun. 26, 2014

(51) Int. Cl.
*H04N 7/15* (2006.01)
*H04N 5/262* (2006.01)

(52) U.S. Cl.
CPC ............ *H04N 7/152* (2013.01); *H04N 5/2624* (2013.01)

(58) Field of Classification Search
CPC ............................ H04N 7/152; H04N 5/2624
USPC ........................................ 348/14.07; 709/204
See application file for complete search history.

(56) References Cited

U.S. PATENT DOCUMENTS

| 8,169,463 | B2 | 5/2012 | Enstad et al. |
| 8,947,493 | B2* | 2/2015 | Lian et al. ................. 348/14.08 |

* cited by examiner

*Primary Examiner* — Creighton Smith
(74) *Attorney, Agent, or Firm* — Hahn Loeser & Parks LLP (57) ABSTRACT

In one embodiment, a method includes: receiving an image stream captured by an image capture device associated with one of a plurality of video conferencing endpoints of a video conferencing system; receiving a request to detect objects in the received image stream; upon detecting one or more objects, displaying a first framing preview of the received image stream, wherein the first framing preview is framed to include the detected one or more objects; upon detecting a change in the detected one or more objects, displaying at least one second framing preview of the received image stream, wherein the at least one second framing preview is framed to include the detected change in the detected one or more objects; and receiving an input, the input selecting a relevant framing preview to use, wherein the relevant framing preview is one of the displayed first and at least one second framing previews.

19 Claims, 5 Drawing Sheets

VIDEO CONFERENCING FRAMING PREVIEW

TECHNICAL FIELD

The present disclosure generally relates to methods and apparatus to display a customized view of a video conferencing room of a video conferencing endpoint.

BACKGROUND

In most video conferencing systems, high quality cameras with pan-, tilt-, and zoom capabilities are used to frame a view of the meeting room and the participants in the conference. The video stream from the camera is compressed and sent to one or more receiving sites in the video conference. All sites in the conference receive live video and audio from the other sites in the conference, thus enabling real time communication with both visual and acoustic information.

Adjustments to the camera may be made both before and during the video conference to display an optimal view of a site typically to show some of all participants present at a particular site. These adjustments may be done manually via a remote control, either by controlling the camera pan, tilt and zoom, or by choosing between a set of predefined camera positions. Other ways of automatically adjusting the camera rely on image and/or audio analysis. However, these conventional systems require repetitive inputs from a user or complex image and audio analysis. None of them describe a simplified system enabling a user to choose which customized view of a video conferencing site to send to the other sites.

DETAILED DESCRIPTION

Overview

In one embodiment, a method includes: receiving an image stream captured by an image capture device associated with one of a plurality of video conferencing endpoints of a video conferencing system; receiving a request to detect objects in the received image stream; upon detecting one or more objects, displaying a first framing preview of the received image stream, wherein the first framing preview is framed to include the detected one or more objects; upon detecting a change in the detected one or more objects, displaying at least one second framing preview of the received image stream, wherein the at least one second framing preview is framed to include the detected change in the detected one or more objects; and receiving an input, the input selecting a relevant framing preview to use, wherein the relevant framing preview is one of the displayed first and at least one second framing previews.

Exemplary Embodiments

Figure 1:
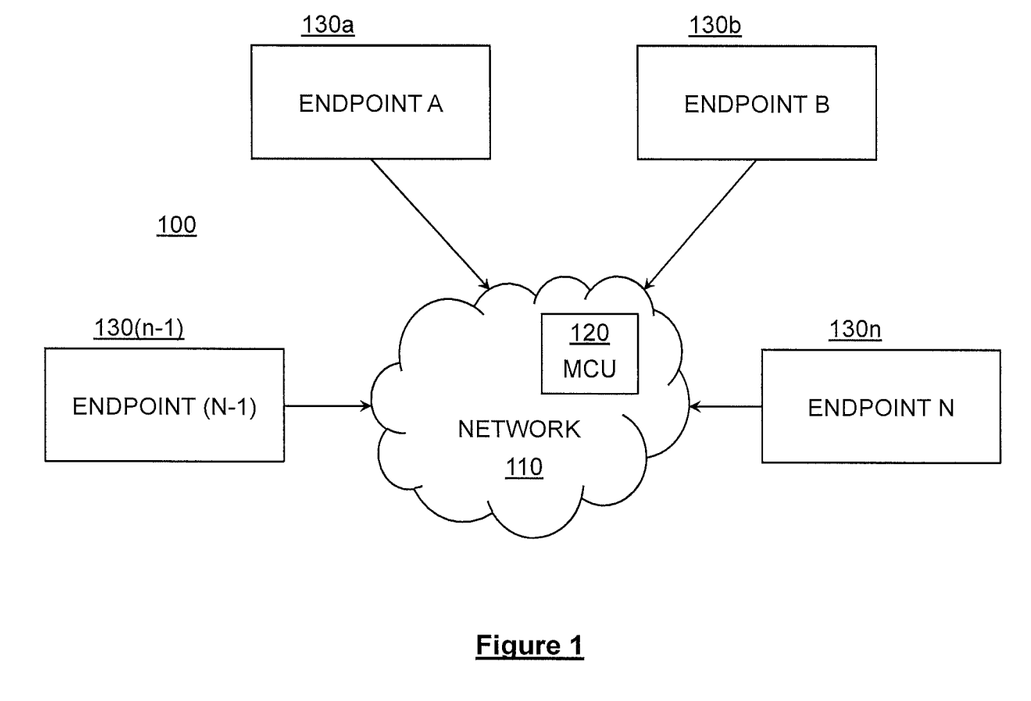
FIG. 1 is a simplified block diagram illustration of a video conferencing system according to an embodiment of the present invention.

Reference is now made to FIG. 1 which is a simplified block diagram illustration of a video conferencing system according to an embodiment of the present invention.

FIG. 1 shows a video conferencing system 100. The video conferencing system 100 may include a communications network 110, one or more multipoint control units (MCU) 120, and a plurality of video conferencing endpoints 130a-130n. The communications network 110 may be, for example but without limiting the generality of the invention, a packet switched network, a circuit switched network, or a combination of both. The video conferencing endpoints 130a-130n are operable to send and receive both audio and video data. Communications over the network may be based on any suitable communication protocols such as H.320, H.324, H.323, SIP, etc., and may use compression standards such as H.263, H.264, etc. The MCU 106 is operable to initiate and manage videoconferencing sessions between two or more video conferencing endpoints 130a-130n. Typically, the MCU 120 is further operable to mix audio data received from one or more video conferencing endpoints 130a-130n, generate mixed audio data, and send mixed audio data to appropriate video conferencing endpoints 130a-130n. Additionally, MCU 120 is operable to receive image streams from one or more image capture devices from one or more video conferencing endpoints 130a-130n. One or more of these image streams may be combined by the MCU 120 into combined image streams. Image streams, combined or otherwise, may be sent by the MCU 120 to appropriate video conferencing endpoints 130a-130n to be displayed on display devices associated with the respective video conferencing endpoints 130a-130n. Although shown as located in the communications network, those skilled in the art will appreciated that the MCU 120 may be located at any suitable location of the video conferencing system 100 such as one of the different video conferencing endpoints 130a-130n.

Figure 2:
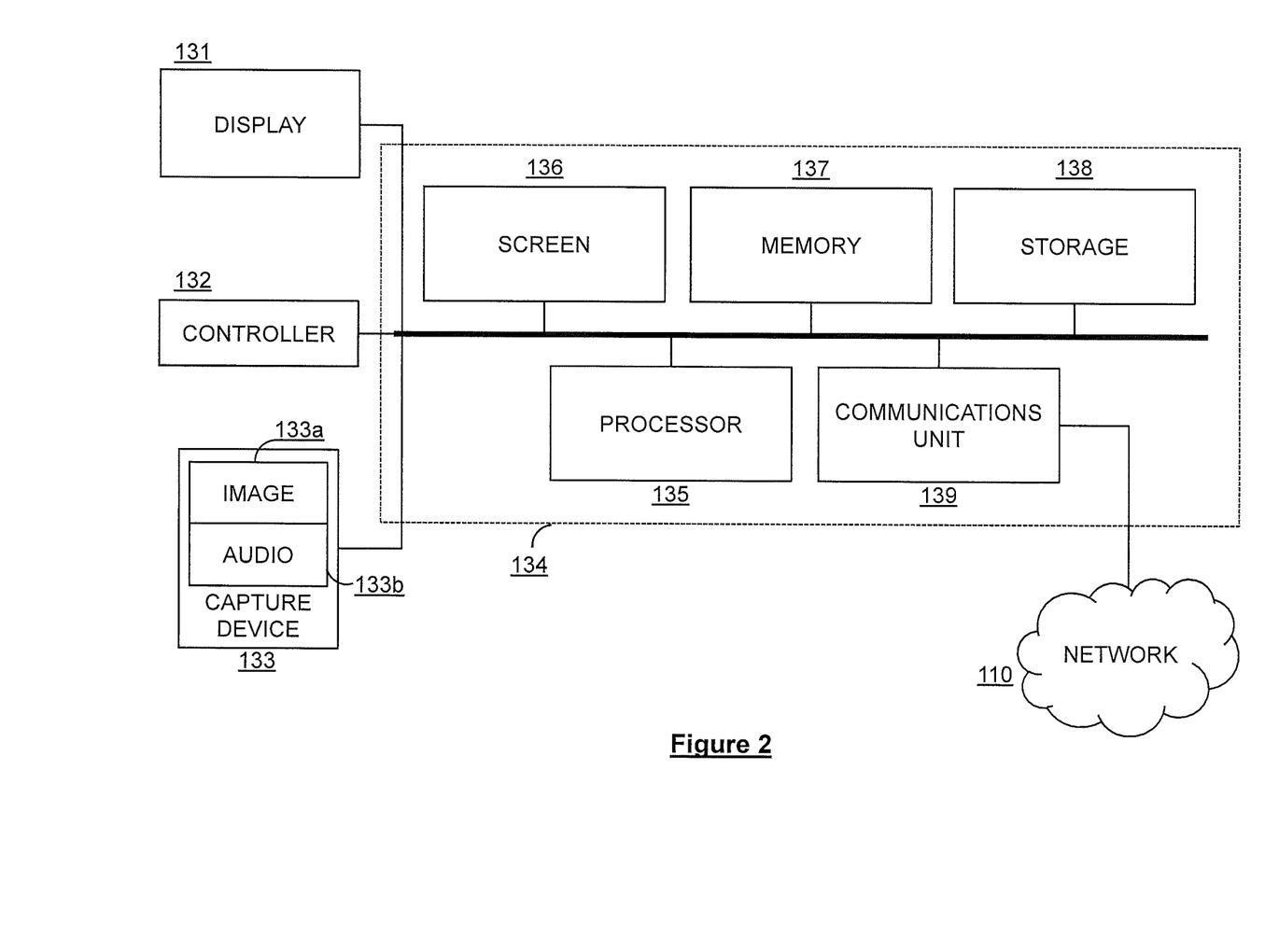
FIG. 2 is a simplified block diagram illustration of a video conferencing endpoint of the video conferencing system in accordance with an embodiment of the present invention.

Reference is now made to FIG. 2 which is a simplified block diagram illustration of a video conferencing endpoint of the video conferencing system in accordance with an embodiment of the present invention.

FIG. 2 shows a video conferencing end point 130a comprising a plurality of components. The video conferencing endpoint 130a typically comprises, for example but without limiting the generality of the invention, a display device 131, a controller 132, a control unit 134 and image 133a and audio 133b capture devices part of an image capture device 133. The control unit 134 further comprises a display screen 136, a memory 137, a storage unit 138, a processor 135 and a communication unit 139. The control unit 134 of the video conferencing endpoint 130a may communicate (i.e. exchange audio and video information and/or any additional data) with the other video conferencing endpoints over the communications network 110 and the MCU 120.

The image capture device 133 of the video conferencing endpoint 130a typically comprises one or more cameras operable to capture image streams relevant to a video conferencing room. The video conferencing room may, for example, include a plurality of objects such as participants present in the room, wall, tables, chairs, white boards, etc. The image capture device 133 captures image streams and provides them to the control unit 134. The image capture device 133 typically comprises one or more mechanical or digital Pan-Tilt-Zoom (PTZ) cameras. However, those skilled in the art will appreciate that other types of cameras may also be used. Additionally, the audio capture device 133b may comprise one or more microphones operable to capture the audio streams and provide them to the control unit 134. The captured audio and video streams are transmitted to the communication unit 139 and/or directly to the processor 135 via the bus or any other communication mechanism for communicating information.

The display device 131 is any appropriate display or screen suitable to display an image stream received from the control unit 134. The display device 131 may display an image stream received at the communication unit 139 from one of the remote video conferencing endpoints over the communications network 110. Alternatively and/or additionally, the image stream received from the image capture device 133 may be displayed by the display device 131 and/or processed by the processor 135 prior to being transmitted to the display device 131.

The video conferencing end point 130a may also include a controller 132. The controller 132 may be any type of input devices, such as a keyboard, a pointing device (e.g. mouse, trackball, pointing stick, etc.), a remote control unit or even a touchscreen device enabling a participant of the video conferencing room to interact with the control unit 134 of the video conferencing endpoint 130. Although shown as external to the control unit, those skilled in the art will appreciate that the controller 132 may be integral with the control unit 134. For example, but without limiting the generality of the invention, the display screen 136 may be provided as part of the control unit 134 and may be used in combination with the controller 132 or even as a controller for a video conferencing user to interact with the control unit 134 of the video conferencing endpoint 130a. The display devices 131 and 136 may further display a graphical user interface (GUI) enabling a video conferencing user to enter commands via the controller 132. The GUI typically comprises a layout customized for a particular display and control buttons. Each control button is associated with a particular function (e.g. one or more particular sets of instructions stored in the memory 137 and executed by the processor 135 as per needed) and enables a user to perform several different actions such as, for example but without limiting the generality of the invention, browsing the GUI, controlling the display devices 131 and 136, initiating a video conference with one or more other video conferencing endpoints, searching through a directory, communicating with other participants located in other video conferencing endpoints, choosing how the video streams received from the image capture device 133 and/or received from other video conferencing endpoints over the communications network 110 have to be composited and displayed, adjusting the audio settings, etc.

The control unit 134 typically comprises a memory 137, such as a random access memory (RAM) or other dynamic storage device (e.g. dynamic RAM, static RAM, synchronous RAM, etc.) coupled to the bus for storing information and instructions to be executed by the processor 135. Additionally, the memory 137 may be used to store temporary variables and/or other intermediate information during the execution of instructions by processor 135. It will be appreciated by those skilled in the art that the memory 137 may be a single memory or split into a plurality of memories. For example, a further memory may be provided such as a read only memory (ROM) or any other static storage (e.g. programmable ROM, erasable programmable ROM, and electrically erasable programmable ROM, etc.) coupled to the bus for storing static information and instructions for the processor 135. The control unit 134 further comprises a storage device 138 such as a magnetic hard disk, or a removable media drive (e.g. floppy disc drive, read-only compact disc drive, read/write compact disc drive, compact disc jukebox, tape drive, and removable magneto-optical drive), etc. coupled to the bus for storing other information and/or instructions.

The control unit 134 also includes a processor 135 operable to process any command received from a video conferencing user, triggered by the video conferencing endpoint 130a or received from the communications network 110 (e.g. from the MCU 120 and/or from another video conferencing endpoint). In response to a received command, the processor 135 retrieves the relevant set(s) of instructions from one of the memories 137-138 and executes them. For example, when a video conferencing user presses a button displayed on the GUI, the processor 135 retrieves the corresponding set(s) of instructions from one of the memories 137-138 and executes the set(s) of instructions. As a result, the action associated with the button pressed by the video conferencing user is performed. Those skilled in the art will appreciate that the present invention is not limited to this single processor arrangement but that one or more processors in a multi-processor arrangement may be employed to execute the set(s) of instructions retrieved from one of the memories 137-138.

Finally, the control unit 134 also includes a communication unit 139 coupled to the bus. The communication unit 139 is a communication interface providing a two-way communication coupling between the video conferencing endpoint 130a and the communications network 110. Additionally and/or alternatively, the communication unit 139 is operable to receive any type of data information from the different devices of the video conferencing endpoint 130a such as the display device 131, the controller 132 and the image and audio capture devices 133a and 133b and passes them to the processor 135 for further processing and/or to other video conferencing endpoints of the video conferencing system 100 over the communications network 110. Also, the communication unit 139 is able to receive any additional data information received by a further device present in the video conferencing endpoint 130a. For example, a personal computer (PC), a laptop computer, a handheld device may be connected to the control unit to exchange data information. Also, the control unit 134 may be connected to any type of network (e.g. intranet, Internet, Wide Area Network, Local Area Network, etc.) or servers (e.g. internal, remote, external servers, etc.) thereby being able to exchange additional data information. The communication unit 139 is therefore operable to exchange (e.g. transmit and receive) any suitable type of data information with a plurality of devices coupled to the control unit 134 of the video conferencing endpoint 130a as well as exchange information with remote video conferencing endpoints or the MCU 120 of the video conferencing system 100 over the communications network 110.

In the above description of FIG. 2, the different blocks are set forth in order to provide a thorough understanding of the various principles of the present invention. However, those skilled in the art will appreciate that not all these details are necessarily always required for practicing the present invention or limited to this particular configuration. In this instance, well-known circuits, control logic, and the details of computer program instructions for conventional algorithms and processes have not been shown in detail in order to not obscure the general concepts unnecessarily. Furthermore, the different components which are, for clarity, described separately may also be provided in combination in a single component. Conversely, various components of the invention which are, for brevity, described in a single component may also be provided separately.

Figure 3:
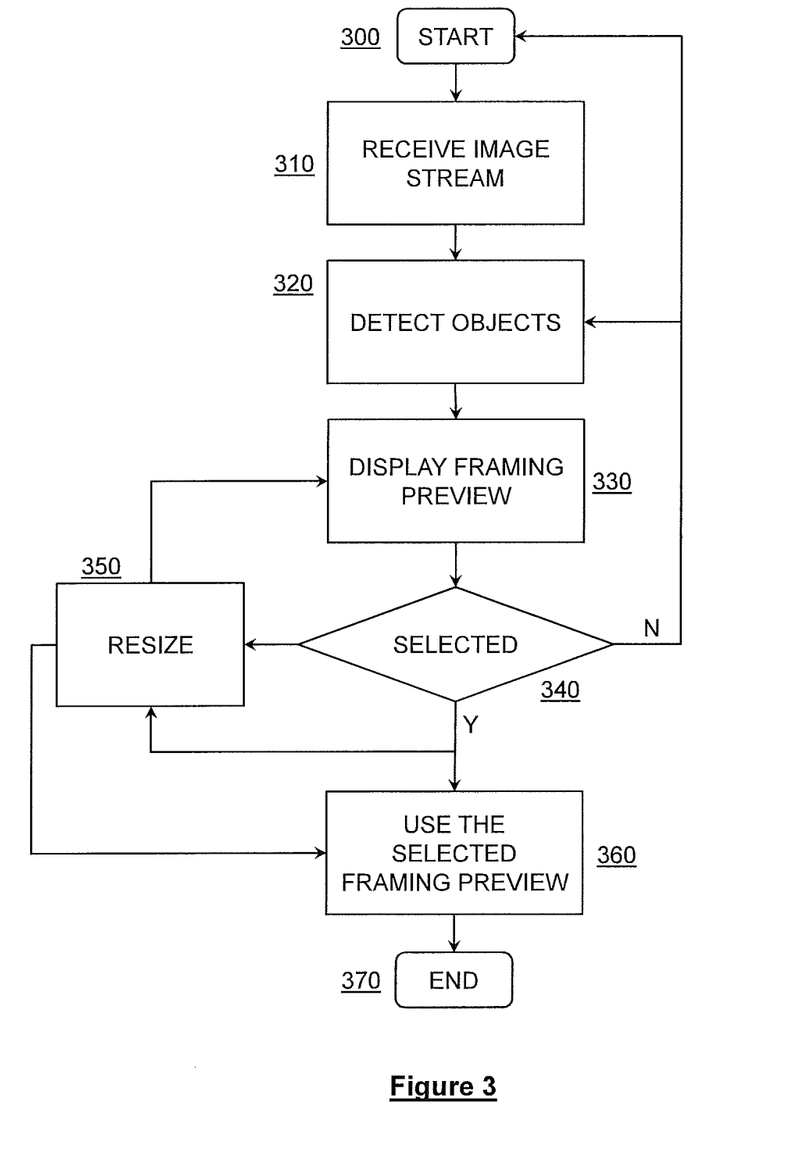
FIG. 3 is a flow chart diagram describing a method of operating a video conferencing endpoint to display a customized view of objects present in a video conferencing room according to an embodiment of the present invention.

Reference is now made to FIG. 3 which is a flow chart diagram describing a method of operating a video conferencing endpoint to display a customized view of objects present in a video conferencing room according to an embodiment of the present invention.

The process starts at step 300 when the control unit 134 of the video conferencing endpoint 130a typically receives an input requesting the control unit 134 to display one or more customized views of a video conferencing room of a video conferencing endpoint. This input is typically received from a user of a video conferencing endpoint 130a operating the remote controller 132 and corresponds to a request for identifying/detecting one of more participants present in the video conference room. This operation is typically requested at the time when a video conference is about to start or at the beginning of the video conference in order to select a customized view of a video conferencing room to be transmitted to the other video conferencing endpoints that are going to be connected to the video conference session. Those skilled in the art will appreciate that this input may also be generated automatically by the control unit 134. For example, this input may be generated upon waking up (e.g. from a standby mode for instance) or switching on the control unit 134, the display device 131, or the video conferencing endpoint 130a. In such a situation, a set of instructions stored in one of the memories 137-138 may be processed by the processor 135 of the control unit 134 requesting the control unit 134 to display one or more framing previews of video conferencing room of a video conferencing endpoint.

The process then moves to step 310 at which the control unit 134 receives the image stream from the image capture device 133. It will be appreciated by those skilled in the art that the control unit 134 may already be receiving the image stream from the image capture device 133 at the time when it receives the input to display one or more customized views. In this situation, the process moves directly from step 300 to step 320.

At step 320, the processor 135 processes the image stream received from the image capture device 133 and is operable to identify one or more participants present in the video conferencing room. Typically, the processor 135 may use any suitable face (or head)-finding and/or face (or head)-tracking algorithm to detect the participants currently being present in the video conferencing room of the video conferencing endpoint 130a. Furthermore, the processor 135 is also able to use an imperfect or incomplete face detection algorithm to detect the participants thereby easing and speeding up the detection process and in turn the display of the customized views. Indeed, the processor 135 analyses the images of the image stream received from the image capture device and is required to detect the participants without precisely identifying them. Once one or more objects (e.g. participants) are detected by the processor 135, the process moves to step 330.

At step 330, the processor 135 is able to define a frame around the identified objects as soon as the one or more objects have been detected. The current orientation and degree of zoom of the image capture device 133 typically defines an initial framework into which the identified one or more objects are located. In another embodiment of the present invention, the image capture device 133 is initialized to capture and show an optimal view of the video conferencing room of the video conferencing endpoint 130a. Typically, the image capture device 133 is set to its maximum field of view so that the initial framework corresponds to the whole video conferencing room. Then, the processor 135 is able to dimension a frame so that all the detected objects are included within the frame. The processor 135 is further able to generate and display a customized view—hereinafter referred as a framing preview—which includes the one or more detected objects. A framing preview typically shows a customized view of a video conferencing room of a video conferencing endpoint including one or more objects detected by the processor 135. As it will be apparent in relation with the description of FIGS. 4A-E and 5A-D, the framing preview is displayed on a display device associated with the control unit 134 of the video conferencing endpoint 130a. The framing preview may be displayed either on a display device 131 or on the display screen 136 of the control unit 134.

In response to displaying the framing preview, the control unit 134 may receive a further input. This further input may be received from a user of the video conferencing endpoint 130a selecting the framing preview for use (step 340). Typically, the user is satisfied with the framing preview showing the one or more detected objects and enters a further input to use the displayed framing preview via the controller 132.

As a result, the process moves to step 360. At step 360, the selected flaming preview is used by the control unit 134. In an embodiment of the present invention, the selected framing preview is used to adjust the image capture device 133. In other words, the image capture device 133 is adjusted to frame the received image and audio stream according to the selected relevant framing preview. The processor 135 may, for example, send instructions to an image capture device controller (not shown in FIG. 2) via the bus to position the image capture device 133 according to a new orientation corresponding to the selected framing preview. Then, the image capture device 133 may be repositioned by mechanical or digital PTZ. It will be appreciated by someone skilled in the art, that mechanical or digital panning, tilting and zooming are not necessarily required to adjust the image and audio capture device 133 to frame the selected relevant framing preview. Therefore, the adjusting may comprise one or more of mechanical or digital panning, tilting and zooming. Other techniques for adjusting/repositioning the image capture device 133 according to the selected framing preview will be apparent to those skilled in the art.

In another embodiment of the present invention, the image capture device 133 is not adjusted but rather, the processor 135 may use the selected framing preview to calculate and store a set of parameters in the storage device 138 for later use. This set of parameters typically defines how the image capture device 133 is to be adjusted to match the selected framing preview. The image capture device 133 may therefore be adjusted at a later time if necessary.

In a further embodiment of the present invention, an additional step may be provided (step 350). The user of the video conferencing endpoint 130a may be given the opportunity or may choose to modify the framing preview either when it is displayed at step 330 or after selecting it at step 340. The user can typically use the controller 132 to input new dimensions for the framing preview. In other words, the user can resize the framing preview to show more or less objects (e.g. participants, background, etc.).

Referring now back to step 340, it is possible that the user is not satisfied with the framing preview displayed at step 330. In such a situation, the process returns to step 320 and an updated framing preview can be generated and displayed to the user. Also, while displaying a first framing preview to the user, the processor 135 may detect one or more further objects. Detecting one or more further objects typically corresponds to detecting a change in the one or more objects that were initially detected and may comprise for example, but not limited to, detecting the appearance of one or more additional objects (e.g. participants) in the video conference room, detecting the disappearance or movement of the one or more objects that were initially detected, etc. In this situation, the processor 135 is able to generate and display one or more subsequent framing previews to the user until a selection is made at step 340. In an embodiment of the present invention, a framing preview is displayed on the display device (131, 136) for a predefined duration after which a different framing preview is displayed, etc. In a further embodiment of the present invention, a framing preview is displayed to the user as long as no change (e.g. the same one or more objects are detected) is detected by the processor 135 analyzing the image stream received from the image capture device 133. As soon as a change (e.g. one or more further objects) is detected, an updated framing preview is generated and displayed on a display device (131, 136). This process is reiterated until receiving a user input selecting one of the displayed framing previews. Furthermore, the user, while viewing the different framing previews displayed on the display device (131, 136), is able to go back to a framing preview that was displayed previously to the one currently being displayed on the display device (131, 136). To do so, a set of parameters for each framing preview displayed on the display device (131, 136) is stored in the storage device 138. Each set of parameters typically includes dimensions of the frame defined so that all the detected objects are included within the frame. While viewing a current framing preview, the user may use the controller 132 to go back to a framing preview which was previously displayed and select it for use. Additionally and/or alternatively, the user may also use the controller 132 to go back to step 300 thereby aborting the framing preview process. This option is typically useful in situations where the user is not satisfied with the different framing previews displayed during the process.

The process ends at step 370.

Reference is now made to FIGS. 4A to 4E, which are illustrations showing how the framing previews are displayed according to an embodiment of the present invention.

FIGS. 4A-4E will be described in relation to the method of FIG. 3. FIGS. 4A to 4E show the display device 131 of the video conferencing endpoint 130*a* and a remote controller 132. The display device 131 is operable to display the image stream received from the image capture device 133 and the framing previews. The controller 132 typically comprises a screen displaying a GUI 101 enabling a user to interact with the controller 132 and send commands associated with the buttons (102, 103, 104) part of the GUI 101. Those skilled in the art will appreciate that the present invention is not limited to this particular arrangement. On the contrary, the image stream, as well as the framing previews, may be displayed on the display screen 136 of the control unit 134. Also, when the display device 131 is used for displaying the image stream received from the image capture device 133 and the framing previews, the display screen 136 may be used as the controller 132 and for displaying the GUI 101.

Figure 4A:
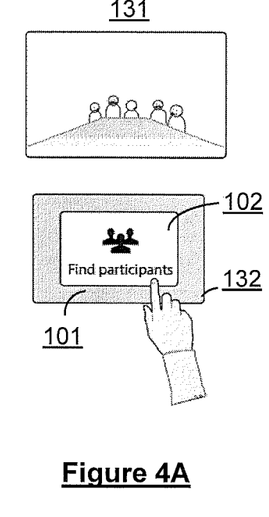
FIGS. 4A to 4E are illustrations showing how the framing previews are displayed according to an embodiment of the present invention.

At steps 300 and 310, the process starts and the image stream received from the image capture device 133 is displayed on the display device 131 as shown in FIG. 4A. Additionally, the controller 132 displays a GUI 101 enabling the user to request the control unit 134 to identify one or more objects (e.g. participants) present in the video conference room. This request is typically triggered by a user touching the button 102 of the GUI 101. A set of instructions stored in one of the memories 137-138 may be processed by the processor 135 of the control unit 134 requesting the control unit 134 to process the received image stream and display one or more framing previews of the video conferencing room of a video conferencing endpoint.

Figure 4B:
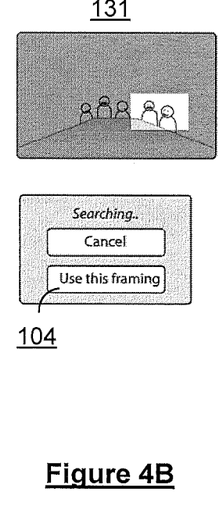

At step 320, the processor 135 processes the image stream received from the image capture device 133 and identifies one or more objects present in the video conferencing room. At step 330, the processor 135 defines dimensions of a first frame around the identified objects. The processor 135 is then able to generate and display a first framing preview including the detected one or more objects. The first framing preview is displayed on the display device 131 as shown on FIG. 4B. Displaying the first framing preview may be achieved by displaying a graphics overlay on top of said received image stream. The graphics overlay typically comprises:

a first portion masking partially or entirely a first area of the received image stream; and a second portion allowing viewing of a second area of said received image stream. The second portion typically corresponds to the dimensions of the defined first frame around the identified objects.

Displaying such a graphics overlay reduces the computing workload of the processor 135 of the control unit 134 and also, does not require any adjusting of the image capture device 133. In parallel, while the first framing preview is displayed on the display device 131, the set of instructions stored in one of the memories 137-138 processed by the processor 135 of the control unit 134 also includes accessing and displaying a new page of the GUI 101. Typically, this new page includes a new layout arrangement with, for example but without limiting the generality of the invention, two additional buttons 103 and 104.

Figure 4C:
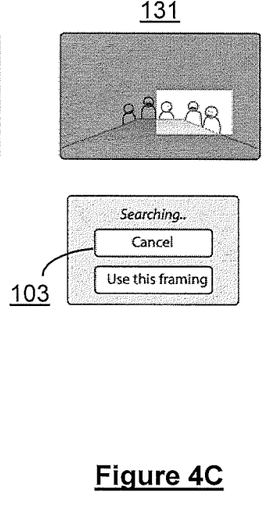
Figure 4D:
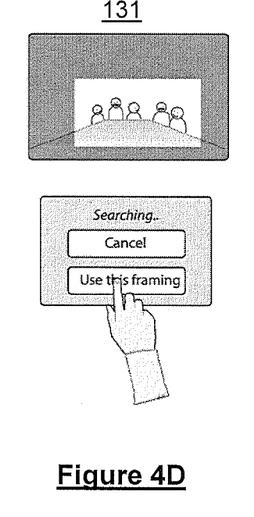
Figure 4E:
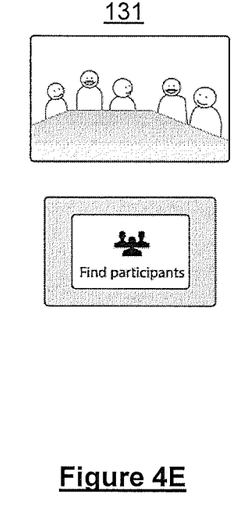

FIGS. 4C and 4D illustrate the iterating process of generating and displaying second and third framing previews when:

1. No further inputs have been received from the user. In other words, the user was not satisfied with the displayed first and second framing previews and did not select one of them using the button 104 of the GUI 101 and/or did not request to go back to a previous framing preview using the button 103 of the GUI 101; and 2. A change (e.g. one or more further objects such as participants present in the video conferencing room) is detected in the image stream processed by the processor 135 of the control unit 134.

FIG. 4D also shows a user entering a further input by touching the button 104 of the GUI 101. Typically, the user is satisfied by the third framing preview displayed on the display device 131 and selects it to be used (step 340).

As a result, the process moves to step 360. The processor 135 processes a set of data instructions associated with the button 104 and the image capture device 133 is adjusted to frame the received image stream according to the selected third framing preview. As described hereinabove, the adjusting may comprise one or more of mechanical or digital panning, tilting and zooming or digital cropping. In parallel, the set of instructions stored in one of the memories 137-138 processed by the processor 135 of the control unit 134 also includes accessing and displaying a new page of the GUI 101 which typically corresponds to the initial page of the GUI 101. The results of both processes are shown on FIG. 4E where the image stream is displayed according to the selected third framing preview and the GUI 101 is displayed as in its original state.

It will be appreciated by those skilled in the art that the different set of instructions may be associated with the buttons (102, 103, 104). For example, although described as enabling the user to go back to a previously displayed framing preview, a particular set of instructions may be associated with the button 104 allowing the user to abort the framing process. In turn, the initial page of the GUI 101 is displayed—as illustrated in FIG. 4A—and the user may then decide to start the process again.

Reference is now made to FIGS. 5A to 5D, which is an illustration showing how the framing previews are displayed according to an embodiment of the present invention.

Figure 5A:
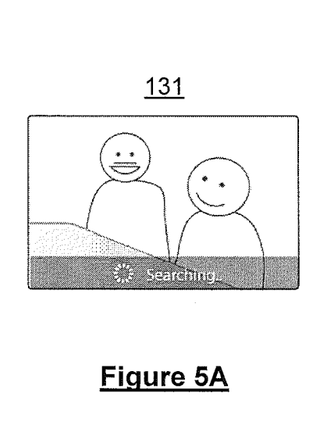
FIGS. 5A to 5D are illustrations showing how the framing previews are displayed according to an embodiment of the present invention.

In an embodiment of the present invention, the different framing previews are directly displayed on the display device 131 by mechanical or digital PTZ or digital cropping. Instead of displaying a graphics overlay on top of the received image stream, the processor 135 uses the dimensions defined for the first frame around the identified objects to adjust the image capture device 133 and display the first framing preview including the detected one or more objects (FIG. 5A). Upon detecting a change (e.g. one or more further objects are detected) in the received image stream, the image capture device 133 may be adjusted again and second, third, etc. framing previews may be displayed as illustrated on FIGS. 5B and 5C. Once a user has selected a relevant framing preview to use, the image stream is ready to be sent to other video conferencing endpoints of the video conferencing system 100. Those skilled in the art will appreciate that the framing previews shown in FIGS. 5A to 5C may be displayed under the control of the remote controller 132 and the GUI 101 described in FIGS. 4A-4E.

Figure 5B:
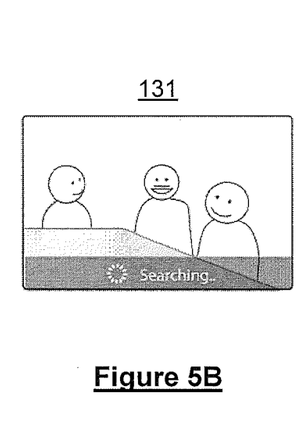
Figure 5C:
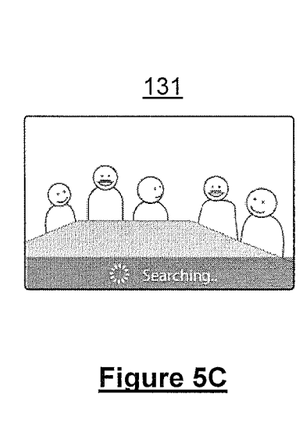
Figure 5D:
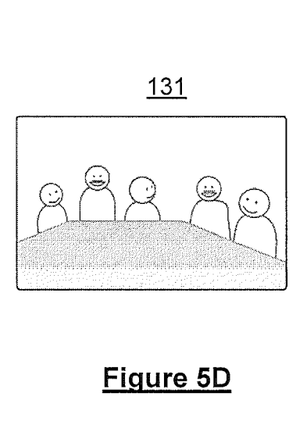

In a further embodiment of the present invention, the framing previews of FIGS. 5A to 5C are displayed on the display screen 136 of the control unit 134. Additionally and/or alternatively, the display screen 136 is also used as the controller 132. In such a situation, the user of the video conferencing endpoint 130a is able to select the relevant framing preview by simply touching the display screen 136 at the time when a framing preview is displayed on the display screen 136 and/or a button (not shown) displayed, for example but without limiting the generality of the invention, on top of the currently displayed framing preview.

Finally, it is appreciated that the present invention and embodiments thereof have been described as being performed at a single video conferencing endpoint 130a. Indeed, the image capture device 133, the display device 131 and the control unit 134 were described as being located in the same video conferencing endpoint 130a. However, in a further embodiment of the present invention, these different devices may be located at different video conferencing endpoints. For example, the image stream captured by an image capture device 133 of a first video conferencing endpoint 130a may be sent over the communications network 110 to a second video conferencing endpoint (130b for instance). The control unit of this second video conferencing endpoint 130b may then be able to process the received image stream as described hereinabove. Once a relevant framing preview has been selected by a user of the second video conferencing endpoint 130b, data instructions may be sent over the communications network 110 to adjust the image capture device 133 of the first video conferencing endpoint 130a. Alternatively, the control unit of the second video conferencing endpoint 130a may digitally crop the received image stream according to the selected framing preview and display it on the display device of the second video conferencing endpoint 130b as such. In turn, it is possible to display the image stream of a first video conferencing endpoint 130a differently on different video conferencing endpoints 130b-130n. This is particularly useful in situations where a user joins a video conference session using a remote device. The remote device may be, for example but not limited to, a personal computer, a laptop computer, a smartphone, a tablet computer or any other suitable handheld device. Such devices typically have limited communications and display capabilities. Therefore, a user of such a remote device has a particular interest in customizing (e.g. selecting a relevant framing preview) how to display the image stream received from the first video conferencing endpoint 130a according to the display characteristics and limitations of his remote device.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

Also, it will be appreciated by persons skilled in the art that the present invention is not limited to what has been particularly shown and described hereinabove. Rather the scope of the invention is defined by the appended claims and equivalents thereof.

The invention claimed is:

1. A method comprising:
   receiving an image stream captured by an image capture device associated with one of a plurality of video conferencing endpoints of a video conferencing system;
   receiving a request to detect objects in said received image stream;
   upon detecting one or more objects, displaying a first framing preview of said received image stream, wherein said first framing preview is framed to include said detected one or more objects and is selectable to be used for adjusting said image capture device;
   upon detecting a change in said one or more objects, displaying at least one second framing preview of said received image stream, wherein said at least one second framing preview is framed to include said detected change in said detected one or more objects and is selectable to be used for adjusting said image capture device;
   receiving an input, said input corresponding to a user's selection of one of said first framing preview and said at least one second framing preview as a relevant framing preview; and
   adjusting said image capture device based on said relevant framing preview.

2. The method of claim 1, wherein said displaying a first framing preview and said displaying at least one second framing preview each comprise displaying a graphics overlay on top of said received image stream.

3. The method of claim 2, wherein each said graphics overlay comprises a first portion masking a first area of said received image stream and a second portion allowing viewing of a second area of said received image stream.

4. The method of claim 3, wherein said second portion is dimensioned to allow viewing of said detected one or more objects of said received image stream or to allow viewing of said detected change in said detected one more objects of said received image stream.

5. The method of claim 1, wherein said adjusting is performed by one or more of mechanical or digital panning, tilting, and zooming of said image capture device.

6. The method of claim 1, wherein said displaying a first framing preview and said displaying at least one second framing preview each comprise:
   adjusting said image capture device to frame said received image stream, said received image stream being framed to include said detected one or more objects or to include said detected change in said detected one or more objects; and displaying said adjusted image stream on a display device.

7. The method of claim 6, wherein said adjusting is performed by one or more of mechanical or digital panning, tilting, and zooming of said image capture device.

8. The method of claim 1, wherein said receiving a request comprises receiving a request to detect participants in a video conferencing end point of said video conferencing system, said request being initiated by a user's input operating a controller or automatically at a beginning of a video conferencing session.

9. The method of claim 1, wherein said first framing preview and/or said at least one second framing preview are displayed for a predefined duration.

10. The method of claim 1, wherein said at least one second framing preview is displayed as soon as said change in said detected one or more of objects is detected.

11. The method of claim 1, wherein said detecting a change in said detected one or more objects comprises detecting one or more of the appearance of one or more additional objects in said received image stream, the disappearance of one or more of said one or more objects in said received image stream, or a movement of one or more of said one or more objects in said received image stream.

12. The method of claim 1, said method further comprising:
receiving a further input, said further input specifying new dimensions for said first framing preview or said at least one second framing preview; and
updating said first framing preview or said at least one second framing preview according to said specified new dimensions.

13. The method of claim 1, wherein said method further comprising:
receiving a further input, said further input specifying new dimensions for said selected relevant framing preview; and
updating said selected relevant framing preview according to said specified new dimensions.

14. The method of claim 1, wherein said displaying at least one second framing preview comprises displaying at least one second framing preview whenever a change in said detected one or more objects is detected.

15. A video conferencing system comprising:
an image capture device associated with one of a plurality of video conferencing endpoints of a video conferencing system operable to capture an image stream;
a control unit comprising:
a communication unit operable to receive said image stream from said image capture device;
a controller operable to receive a request to detect objects in said received image stream;
an image processor operable to detect one or more objects in said image stream and to generate a first framing preview of said received image stream, wherein said first framing preview is framed to include said detected one or more objects and is selectable to be used for adjusting said image capture device; said image processor being further operable to detect a change in said one or more objects and to generate at least one second framing preview of said received image stream, wherein said at least one second framing preview is framed to include said detected change in said detected one or more objects and is selectable to be used for adjusting said image capture device;
a display device operable to display said first framing preview and said at least one second framing preview of said received image stream generated by said image processor; and
wherein, said controller is further operable to receive an input, said input corresponding to a user's selection of one of said first framing preview and said at least one second framing preview displayed on said display device as a relevant framing preview; and said image processor is further operable to adjust said image capture device based on said relevant framing preview.

16. The system of claim 15, wherein:
said image processor of said control unit is further operable to send instructions to said image capture device to frame said received image stream according to said first framing preview, said at least one second framing preview or said selected relevant framing preview; and
said image capture device comprises an image capture device controller operable to receive said instructions and further operable to adjust said image capture device in response to said instructions.

17. The system of claim 15, wherein said image capture device and said control unit are located in a same video conferencing end point of said video conferencing system.

18. The system of claim 15, wherein said image capture device and said control unit are located in different video conferencing end points of said video conferencing system.

19. One or more computer readable non-transitory tangible storage media encoded with software comprising computer executable instructions being operable, when the software is executed, to:
receive an image stream captured by an image capture device associated with one of a plurality of video conferencing endpoints of a video conferencing system;
receive a request to detect objects in said received image stream;
display a first framing preview of said received image stream upon detecting one or more objects, wherein said first framing preview is framed to include said detected one or more objects and is selectable to be used for adjusting said image capture device;
display at least one second framing preview of said received image stream upon detecting a change in said detected one or more objects, wherein said at least one second framing preview is framed to include said detected change in said detected one or more objects and is selectable to be used for adjusting said image capture device; and
receive an input, said input corresponding to a user's selection of one of said first framing preview and said at least one second framing preview as a relevant framing preview; and
adjust said image capture device based on said relevant framing preview.

* * * * *